UNITED STATES PATENT OFFICE.

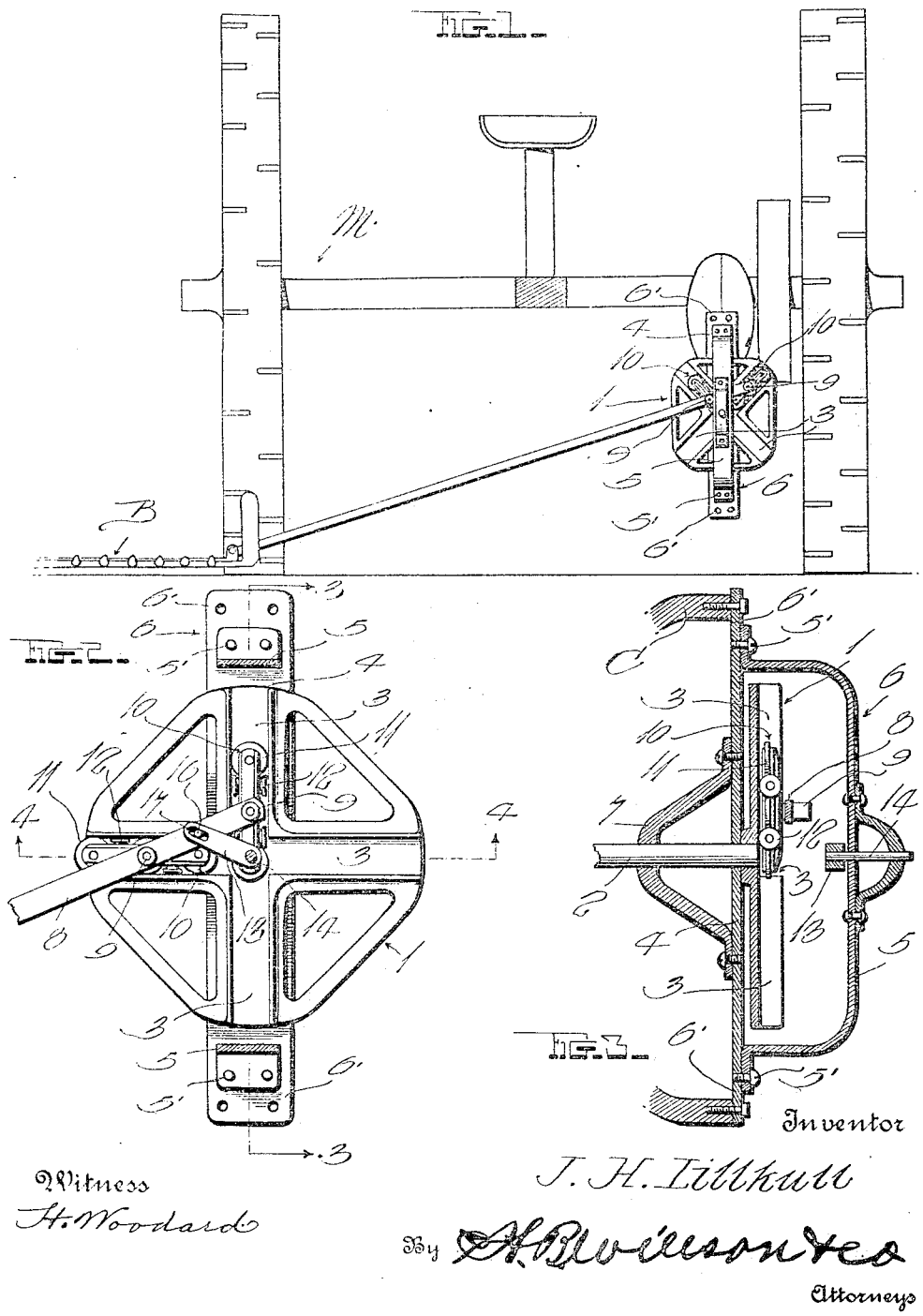

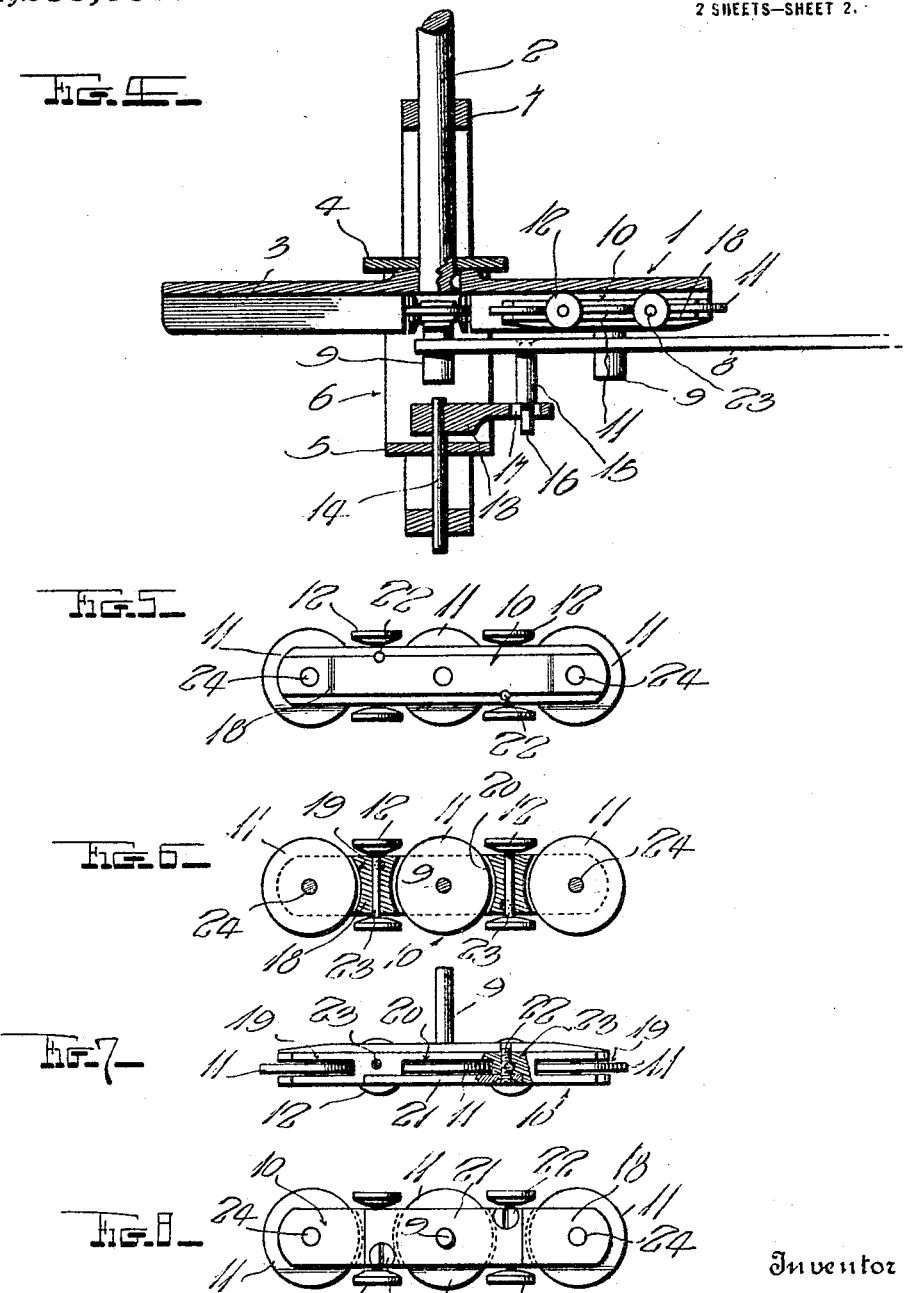

JOSEPH HENRIKSON LILLKULL, OF BURNTRANCH, CALIFORNIA.

POWER-TRANSMISSION MECHANISM.

1,288,066.  Specification of Letters Patent.  Patented Dec. 17, 1918.

Application filed June 1, 1918. Serial No. 237,806.

*To all whom it may concern:*

Be it known that I, JOSEPH HENRIKSON LILLKULL, a citizen of the United States, residing at Burntranch, in the county of Trinity and State of California, have invented certain new and useful Improvements in Power-Transmission Mechanism; and I do declare the following to be a full, clear, and exact description of the invention, such as will enable others skilled in the art to which it appertains to make and use the same.

My invention has for its principal object to provide a simple, inexpensive, efficient, durable and easy running mechanism for driving one shaft from another at twice the speed of the latter without loss of power, the invention being particularly well adapted for use on spring motors, although it is also of advantage on mowing machines, steam and gasolene engines, pumps, aeroplane motors and numerous other machines, it being intended that sheet steel shall be used to render the device rather light for aircraft, yet sufficiently strong.

Another object of the invention is to provide a mechanism of the class set forth which will operate with a comparatively small amount of friction, and to this end, another object is to improve upon the construction of the carriages used so as to reduce friction to the minimum.

A further object is to provide novel means for holding the two carriages in proper engagement with the tracks upon which they travel without in any manner retarding the operation of said carriage.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is an elevation of the invention applied to a mowing machine;

Fig. 2 is an enlarged elevation similar to a portion of Fig. 1 with a part of the supporting frame removed;

Fig. 3 is a vertical section on the plane of the line 3—3 of Fig. 2;

Fig. 4 is a horizontal section on the plane indicated by the line 4—4 of Fig. 2;

Fig. 5 is a top plan view of one of the carriages;

Fig. 6 is a horizontal section thereof;

Fig. 7 is an edge view with parts broken away and in section; and

Fig. 8 is a bottom plan view.

In the drawings above briefly described, the numeral 1 designates a wheel mounted rigidly on one end of a shaft 2, said wheel being of any preferred construction and having a pair of channel shaped tracks 3 positioned at right angles to each other and crossing one another at the center of the wheel. The wheel 1 is located between the side bars 4 and 5 of an open frame 6, the bar 4 being straight while the ends of bar 5 are bent toward said bar 4 and suitably secured thereto at 5'. The ends of the bar 4 extend beyond the connection 5' to provide ears 6' for securing the frame to any suitable support. A bearing bracket 7 is secured to the outer side of bar 4 and shaft 2 passes rotatably through this bracket and through said bar as is shown clearly in Figs. 3 and 4.

A pitman rod 8 is positioned at the front side of the wheel 1 and is pivoted at 9 to the centers of a pair of carriages 10 which are slidable along the two channel shaped tracks 3, each of said carriages having three anti-friction rollers 11 contacting with the sides of the tracks and four smaller anti-friction rollers 12 traveling on the bottoms thereof. To properly retain the carriages 10 in the tracks 3, an arm 13 is pivoted at 14 to the side bar 5 of the frame 6, the free end of said arm resting upon a thrust post 15 which projects laterally from the pitman rod 8, said post having a longitudinal stud 16 received loosely in a slot 17 formed in the free end of the arm. By this arrangement, the arm 13 forces the carriages 10 inwardly to retain their rollers 12 upon the bottoms of the channel shaped tracks 3, so that canting of these carriages which would otherwise cause them to bind, is prevented. It is to be understood that although the arm 13 performs this useful function, it in no manner interferes with the proper sliding of the two carriages along their respective tracks nor with the oscillatory and reciprocatory motion of the pitman rod 8.

Each of the carriages 10 above mentioned is preferably constructed as featured in Figs. 5, 6, 7 and 8. In these figures, the numeral 18 designates a metal bar having notches 19 in its ends and a recess 20 between said ends to receive the three rollers 11, the central roller being retained in the recess 20 by a plate 21 inset in the lower side of the bar 18 and held in place by screws 22. The axles 23 of the rollers 12 pass transversely through the bar 18 between the rollers 11 and these axles preferably extend through one side of the screws 22 as featured in Fig. 7, so that after the axles are applied and the rollers 12 riveted thereon, there is no way of disassembling the carriage until these rollers are again detached to permit removal of their axles. The central roller 11 is by preference mounted on the inner end of the pin 9 by means of which the carriage is pivoted to the pitman rod 8, while rivets 24 pass through the ends of the bar 18 to rotatably mount the endmost rollers 11.

The invention may be used wherever it is desirable and for illustrative purposes I have shown it in use upon a mowing machine M for the purpose of operating its sickle bar B. When so applied the attaching ears 6' will be secured to the front end of the usual casing C of the forwardly extending drive shaft 2, this shaft being driven from the wheels of the machine through the well known gearing. Regardless of its particular use, the invention will be highly efficient and durable and will render it possible to attain high speed with the expenditure of little power, since each revolution of the wheel causes a greater number of strokes of rod 8 than the usual eccentric. It will also be seen that by providing two parallel shafts with the wheels 1 and carriages 10, and connecting the two sets of carriages by a single rod such as 8, one shaft may be driven from the other at twice the speed of the latter, without loss of power. This cannot be done by gearing or the like now used since all increase in speed now means decrease in power.

I wish it understood that within the scope of the invention as claimed, numerous minor changes may well be made and that stampings, castings or forgings may be employed in the construction of the improved mechanism. Since probably the best results are obtained from the construction shown, this construction constitutes the preferred form of my invention.

I claim:

1. In a power transmitting mechanism, the combination of a wheel having a pair of diametrically extending channel-shaped tracks crossing each other at the center of the wheel and located in right angular relation, a pair of carriages traveling in said tracks, each carriage having anti-friction rollers engaging the sides of said tracks and other rollers traveling on the bottoms thereof, a pitman rod pivoted to the two carriages, an open frame in which the wheel is mounted, and an arm for retaining said carriages in proper engagement with said tracks, one end of said arm being pivoted to the side of the frame adjacent the open sides of said tracks, while the other end of said arm is pivoted to said pitman rod between its pivotal connections with said carriages.

2. A structure as specified in claim 1, said frame comprising a straight side bar through which the shaft of said wheel passes, and another side bar parallel with said first named bar and having its ends bent toward and secured to the latter, the ends of said first named side bar extending beyond the points of connection with the other side bar to form attaching ears for the frame.

3. An article of manufacture for the herein described power transmitting mechanism comprising a metal bar having a notch in each end and a recess between its ends, anti-friction rollers rotatably mounted in said notches and recess, a roller retaining plate inset in one side of the bar and extending over said recess to retain the central roller in place, screws passing through said retaining plate and threaded into said bar between the rollers for securing said plate in place, transverse axles extending through said bar between said rollers and passing through one side of said screws to prevent rotation of the latter, and additional rollers on the ends of said axles.

In testimony whereof I have hereunto set my hand in the presence of two subscribing witnesses.

JOSEPH HENRIKSON LILLKULL.

Witnesses:
  W. C. KIRRÉ,
  GUS. PERIGOT.

Copies of this patent may be obtained for five cents each, by addressing the "Commissioner of Patents, Washington, D. C."